US012058503B2

(12) United States Patent
Yang et al.

(10) Patent No.: US 12,058,503 B2
(45) Date of Patent: Aug. 6, 2024

(54) SOUND-PRODUCING DEVICE

(71) Applicant: Goertek Inc., Shandong (CN)

(72) Inventors: Jianbin Yang, Weifang (CN); Shousong Qiang, Weifang (CN); Chunfa Liu, Weifang (CN)

(73) Assignee: Goertek Inc., Shandong (CN)

( * ) Notice: Subject to any disclaimer, the term of this patent is extended or adjusted under 35 U.S.C. 154(b) by 190 days.

(21) Appl. No.: 17/773,421

(22) PCT Filed: Nov. 5, 2020

(86) PCT No.: PCT/CN2020/126678
§ 371 (c)(1),
(2) Date: Apr. 29, 2022

(87) PCT Pub. No.: WO2021/088913
PCT Pub. Date: May 14, 2021

(65) Prior Publication Data

US 2022/0408192 A1 Dec. 22, 2022

(30) Foreign Application Priority Data

Nov. 8, 2019 (CN) ........................ 201911089347.7

(51) Int. Cl.
*H04R 9/02* (2006.01)

(52) U.S. Cl.
CPC ......... *H04R 9/02* (2013.01); *H04R 2307/201* (2013.01)

(58) Field of Classification Search
CPC ........ H04R 2499/13; H04R 7/18; H04R 9/02; H04R 9/025; H04R 9/043
See application file for complete search history.

(56) References Cited

U.S. PATENT DOCUMENTS

2011/0116678 A1 * 5/2011 Wang .................... H04R 9/043 381/407

* cited by examiner

*Primary Examiner* — Kile O Blair
(74) *Attorney, Agent, or Firm* — Baker Botts LLP

(57) ABSTRACT

A sound-producing device is provided with at least two groups of dampers on the voice coil which are respectively arranged at a first position close to and a second position away from the vibrating diaphragm; the at least two groups of the dampers include at least a first damper and a second damper; the first damper has a first connecting part connected to the voice coil and a second connecting part fixed on the sound-producing device; a planar elastic member is provided between the first and the second connecting parts, which is bent and extends from the first to the second connecting part, and is coplanar with the first connecting part; the second damper has a first fixing part connected to the voice coil and a second fixing part fixed on the sound-producing device; there is provided a corrugated connecting arm between the first and the second fixing parts.

14 Claims, 3 Drawing Sheets b: A Sound-producing Device Installed with a Prior Art Damper: Resonant Frequency F0 ≈195Hz
c: A Sound-producing Device Installed with the Damper of the Present Disclosure: Resonant Frequency F0≈170Hz b: A Sound-producing Device Installed with a Prior Art Damper
c: A Sound-producing Device Installed with the Damper of the Present Disclosure

SOUND-PRODUCING DEVICE

CROSS-REFERENCE TO RELATED APPLICATIONS

This application is a National Stage of International Application No. PCT/CN2020/126678, filed on Nov. 5, 2020, which claims priority to Chinese Patent Application No. 201911089347.7, filed on Nov. 8, 2019, both of which are hereby incorporated by reference in their entireties.

TECHNICAL FIELD

The present disclosure relates to the technical field of electro-acoustic conversion, and particularly to a sound-producing device.

BACKGROUND

A damper is one of the basic components of a sound-producing device, and is mainly used to ensure the correct position of a voice coil in a magnetic gap, to keep the vibration system reciprocating only in the axial direction when the voice coil is under force, and to provide the elastic force for the vibration system to reciprocate.

At present, in a traditional sound-producing device such as in a loudspeaker device, there is usually provided one damper on a bobbin of the voice coil, and the damper is of a corrugated shape. On one hand, the set position of the traditional damper cannot satisfactorily ensure the position of the voice coil in the sound-producing device; on the other hand, the structure of the traditional damper results in an increased height of the loudspeaker in its vibration direction.

Accordingly, in order to solve any of the above-mentioned technical problems, the present disclosure provides a novel sound-producing device.

SUMMARY

An object of the present disclosure is to provide a sound-producing device.

According to one aspect of the present disclosure, a sound-producing device is provided, which comprises a vibrating diaphragm and a voice coil that drives the vibrating diaphragm to vibrate; wherein there are provided at least two groups of dampers on the voice coil which are respectively arranged at a first position close to the vibrating diaphragm and a second position away from the vibrating diaphragm;

the at least two groups of the dampers include at least a first damper and a second damper;

the first damper has a first connecting part and a second connecting part, the first connecting part is connected to the voice coil, and the second connecting part is fixed on the sound-producing device;

there is provided a planar elastic member between the first connecting part and the second connecting part, the planar elastic member is bent and extends from the first connecting part to the second connecting part, and is located in the same plane as the first connecting part;

the second damper has a first fixing part and a second fixing part, the first fixing part is connected to the voice coil, and the second fixing part is fixed on the sound-producing device; there is provided a connecting arm between the first fixing part and the second fixing part, the connecting arm being in a corrugated shape.

Optionally, the voice coil comprises a voice coil body and a bobbin, the voice coil body is wound outside the bobbin and has a height difference from the bobbin:

the first position is a side surface of the bobbin; and the second position is a side surface of the voice coil body close to an end face thereof.

Optionally, at least one first damper is fixed at a first position; a first connecting part of the first damper is fixed by a connection bridge to a first connecting part of one of the other first dampers adjacent to the first damper, and the second damper is fixed at the second position in a segmented manner.

Optionally, the connection bridge is of a convex structure which is attached to the side surface of the voice coil.

Optionally, the second damper is sleeved at the first position; the first damper is uniformly fixed at the second position in an array manner.

Optionally, the sound-producing device further includes a casing, and a conductive terminal is configured to be injection-molded on the casing;

the voice coil is connected to the conductive terminal through a connecting wire.

Optionally, the sound-producing device further includes a basin-shaped U-iron where a magnet is provided in a basin thereof, the voice coil being provided inside the basin of the U-iron and being under action of magnetic field of the magnet;

the U-iron is provided with a notch, and the damper provided at the second position is connected to the voice coil through the notch.

Optionally, the planar elastic member spreads outward along a direction from the first connecting part to the second connecting part, and forms a spreading angle which is no less than 10°.

Optionally, the first damper is formed by integrally winding a metal wire.

Optionally, the first damper is formed from any one of phosphor bronze, iron wire, steel wire, and alloy wire; and the second damper is formed from any one of fiber, cotton, blended fabric or metallic materials.

Optionally, a resonance frequency F0 of the first damper is 50 Hz to 300 Hz.

Advantages of the technical solution of the present disclosure are: the present disclosure provides a sound-producing device, in which at least two groups of dampers are provided on a voice coil of the sound-producing device. Comparing with the prior art, the present disclosure improves stability of the voice coil vibrating in the sound-producing device.

Other features and advantages of the present disclosure will be readily apparent from the following detailed description of exemplary embodiments of the present disclosure with reference to the drawings.

BRIEF DESCRIPTION OF THE DRAWINGS

The accompanying drawings, which are incorporated into this specification and constitute a part thereof, illustrate embodiments of the present disclosure and, together with the description, serve to explain the principles of the present disclosure.

DETAILED DESCRIPTION

Figure 1:
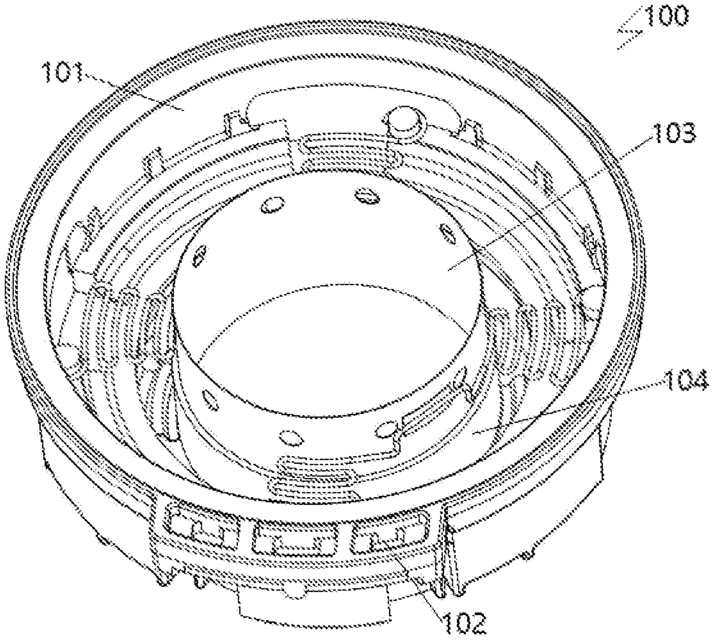
FIG. 1 is a schematic structural view of a sound-producing device according to a first embodiment of the present disclosure.

Various exemplary embodiments of the present disclosure will now be described in detail with reference to the accompanying drawings. It is to be noted that unless otherwise specified, relative arrangement, numerical expressions and numerical values of components and steps illustrated in these embodiments do not limit the scope of the present disclosure.

Description to at least one exemplary embodiment is in fact illustrative only, and is in no way limiting to the present disclosure or application or use thereof.

Techniques, methods and devices known to those skilled in the prior art may not be discussed in detail; however, the techniques, methods and devices shall be regarded as part of the description where appropriate.

In all the illustrated and discussed examples, any specific value shall be explained as only exemplary rather than restrictive. Thus, other examples of exemplary embodiments may have different values.

It is to be noted that similar reference numbers and alphabetical letters represent similar items in the drawings below, such that once a certain item is defined in a drawing, further discussion thereon in the subsequent drawings is no longer necessary.

According to an embodiment of the present disclosure, a sound-producing device is provided. The sound-producing device includes a vibrating diaphragm and a voice coil that drives the vibrating diaphragm to vibrate;

- there are provided at least two groups of dampers on the voice coil which are respectively arranged at a first position close to the vibrating diaphragm and a second position away from the vibrating diaphragm;
- the at least two groups of the dampers include at least a first damper and a second damper;
- the first damper has a first connecting part and a second connecting part, the first connecting part is connected to the voice coil, and the second connecting part is fixed on the sound-producing device;
- there is provided a planar elastic member between the first connecting part and the second connecting part, the planar elastic member is bent and extends from the first connecting part to the second connecting part, and is located in the same plane as the first connecting part;
- the second damper has a first fixing part and a second fixing part, the first fixing part is connected to the voice coil, and the second fixing part is fixed on the sound-producing device;
- there is provided a connecting arm between the first fixing part and the second fixing part, the connecting arm being in a corrugated shape.

In this example, there are at least two groups of dampers provided on the voice coil of the sound-producing device. Comparing with the prior art, the present disclosure improves the stability of the voice coil in the sound-producing device.

Here, the first damper of the sound-producing device of the present disclosure can be optionally formed by winding of a metal material, which can optimize the acoustic performance of the product by reducing the resonance frequency and total harmonic distortion.

Figure 2:
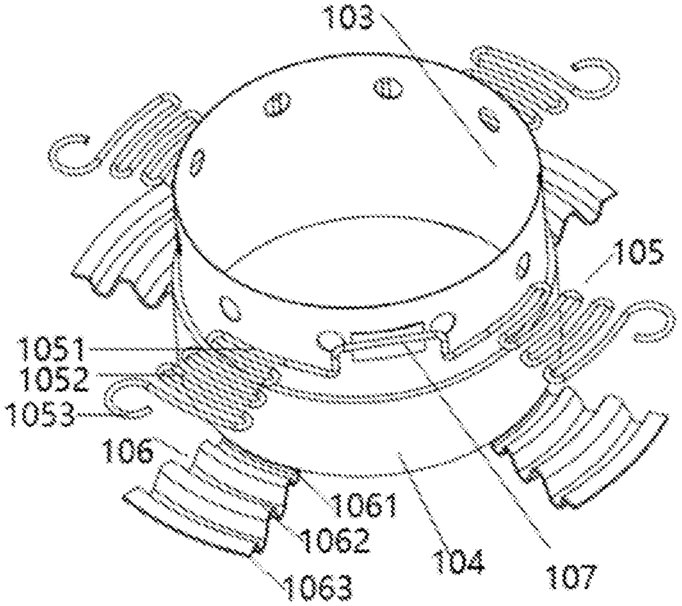
FIG. 2 is a schematic diagram showing part of the internal structure of the sound-producing device in the first embodiment.

In one example, FIG. 1 to FIG. 2 show schematic structural views of the sound-producing device 100 according to the first embodiment of the present disclosure. The sound-producing device includes a vibrating diaphragm and a voice coil that drives the diaphragm to vibrate.

The voice coil includes a voice coil body 104 and a bobbin 103, the bobbin 103 is in the shape of a circular tube, and the voice coil body 104 is wound outside the bobbin to form a circular tube shape having a height difference from the bobbin 103. It should be noted that, although only a circular sound-producing device is used for exemplary illustration in this embodiment, the present disclosure is not limited thereto.

In this example, two groups of dampers are provided on the voice coil; wherein the two groups of dampers include a first damper 105 and a second damper 106.

The first damper 105 has a first connecting part 1051 and a second connecting part 1053, the first connecting part 1051 is connected to the voice coil, and the second connecting part 1053 is fixed on the sound-producing device; there is provided a planar elastic member 1052 between the first connecting part 1051 and the second connecting part 1053, and the planar elastic member 1052 is bent and extends from the first connecting part 1051 to the second connecting part 1053.

Specifically, the first connecting part 1051 is connected to a side surface of the bobbin 103; the second connecting part 1053 is fixed on the sound-producing device, wherein the sound-producing device further comprises a casing 101, and the second connecting part 1053 is fixed on the casing 101. A fixing pillar protrudes from the casing 101, and the second connecting part 1053 is provided on the fixing pillar.

The planar elastic member 1052 is bent and extends from the first connection portion 1051 to the second connection portion 1053, for example, it is bent and extends in an S shape from the first connection portion 1051 to the second connection portion 1053.

The second damper includes a first fixing part 1061 and a second fixing part 1063, the first fixing part 1061 is connected to the voice coil, and the second fixing part 1063 is fixed on the sound-producing device; there is provided a connecting arm 1062 provided between the first fixing part 1061 and the second fixing part 1063, and the connecting arm 1062 is in a corrugated shape. For example, the second damper may be of a corrugated shape.

In this example, the first damper 105 is fixed at a first position, wherein the first position is a side surface of the bobbin 103. Specifically, the first connecting part 1051 is connected to the side surface of the bobbin 103; the second connecting part 1053 is fixed on the casing 101. Here, a plurality of the first dampers 105 are fixed at the first position. In this example, 4 first dampers are fixed at the first position: wherein one first damper connects to another first damper via a connection bridge 107, and first connecting parts of the other two first dampers also connect each other via a connection bridge.

Here, the connection bridge 107 is of a convex structure which is attached to the side surface of the voice coil. Specifically, the convex structure is attached to the side surface of the bobbin 103.

Optionally, the connecting bridge may be of an arc-shaped structure, which is attached to a side surface of the bobbin.

Preferably, a first damper and a damper adjacent to it are integrally formed with the connection bridge.

The second damper is fixed at a second position, wherein the second position is a side surface of the voice coil body 104 close to an end face thereof, wherein the "end face" is the lower end face of the voice coil body 103, namely the bottom of the voice coil body 103. Specifically, the second damper is fixed in the second position in a segmented manner. The "segmented manner" is formed in the following way: dividing the second damper into a plurality of dampers 106 that are of a sector-shaped structure, and fixing the plurality of dampers 106 of a sector-shaped structure on the side surface of the voice coil body 103 close to its end surface. The plurality of dampers 106 that are of a sector-shaped structure each includes a first fixing part 1061 and a second fixing part 1063, and there is provided a connecting arm 1062 between the first fixing part 1061 and the second fixing part 1063. The connecting arm 1062 is of a corrugated shape.

Preferably, the second damper is formed from any one of fiber, cotton, blended fabric or metal materials.

Here, the sound-producing device further includes a basin-shaped U-iron where a magnet is provided in a basin thereof, the voice coil being provided inside the basin of the U-iron and being under action of magnetic field of the magnet;

the U-iron is provided with a notch, and the damper provided at the second position is connected to the voice coil through the notch.

In this example, a plurality of dampers 106 of a sector-shaped structure are configured to be able to be connected to the side surface of the voice coil body 103 close to the end surface thereof through the notch. That is, the notch opened on the U-iron forms an avoidance space, so as to enable a plurality of dampers of a sector-shaped structure to generate vibrations along the vibration direction of the sound-producing device.

Optionally, the sound-producing device 100 further includes a casing 101, and the conductive terminals 102 are configured to be injection-molded on the casing 101. The voice coil is connected to the conductive terminals 102 through a connecting wire, wherein the connecting wire is a lead wire.

In this example, there are provided two groups of dampers on the voice coil of the sound-producing device, which improves the stability of the voice coil in the sound-producing device and ensures that the axis of the voice coil and the axis of the sound-producing device are coaxial without skew.

Figure 3:
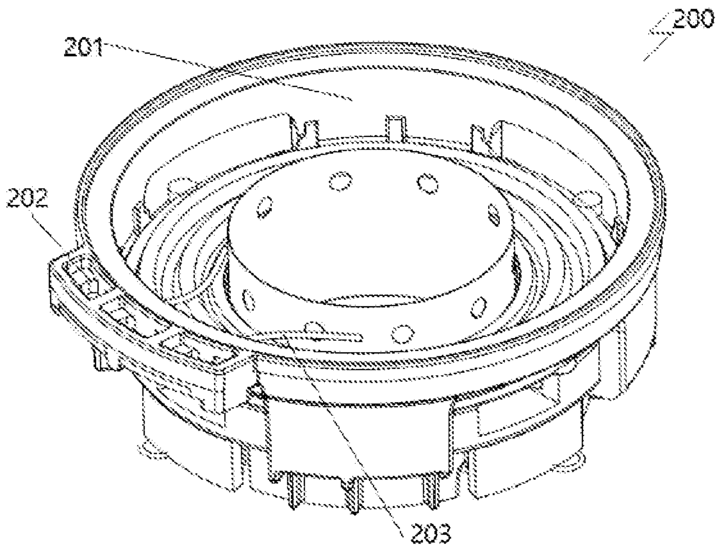
FIG. 3 is a schematic structural view of a sound-producing device according to a second embodiment of the present disclosure.
Figure 4:
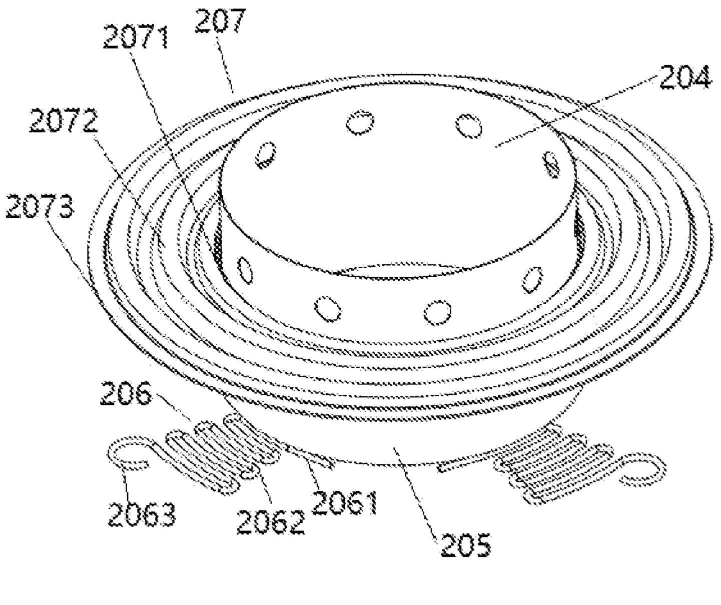
FIG. 4 is a schematic diagram showing a part of the internal structure of the sound-producing device in the second embodiment of the present disclosure.

FIG. 3 and FIG. 4 show in one example, schematic structural views of a sound-producing device 200 according to a second embodiment of the present disclosure. The sound-producing device 200 includes a vibrating diaphragm and a voice coil that drives the diaphragm to vibrate.

The voice coil includes a voice coil body 205 and a bobbin 204, the bobbin 204 is of a circular tube shape, and the voice coil body 205 is wound outside the bobbin to form a circular tube shape with a height difference from the bobbin 204.

In this example, there are provided two groups of dampers on the voice coil; where the two groups of dampers include a first damper 206 and a second damper 207.

The first damper 206 has a first connecting part 2061 and a second connecting part 2063, the first connecting part 2061 is connected to the voice coil, and the second connecting part 2063 is fixed on the sound-producing device. There is provided a planar elastic member 2062 between the first connecting part 2061 and the second connecting part 2063, and the planar elastic member 2062 is bent and extends from the first connecting part 2061 to the second connecting part 2063.

The second damper 207 includes a first fixing part 2071 and a second fixing part 2073, the first fixing part 2071 is connected to the voice coil, and the second fixing part 2073 is fixed on the sound-producing device; There is provided a connecting arm 2072 between the first fixing part 2071 and the second fixing part 2073, and the connecting arm 2072 is in a corrugated shape. For example, the second damper 207 may be a corrugated shape.

In this example, the first damper 206 is fixed at the second position, wherein the second position is a side surface of the voice coil body 205 close to an end face thereof, wherein the "end face" is the lower end face of the voice coil body, namely the bottom of the voice coil body. Specifically, the first dampers 206 are uniformly fixed at the second position in an array manner. In this example, the first dampers 206 are fixed at the second position in an annular array. Specifically, four first dampers are provided on the side surface of the voice coil body 205 close to the end face thereof, wherein the first connecting part 2061 of the first damper 206 is fixed on the side surface of the voice coil body 205 close to the end surface thereof. The second connecting part 2063 is fixed on the casing of the sound-producing device.

Here, the sound-producing device further includes a basin-shaped U-iron where a magnet is provided in a basin thereof, the voice coil being provided inside the basin of the U-iron and being under action of magnetic field of the magnet;

the U-iron is provided with a notch, and the damper provided at the second position is connected to the voice coil through the notch.

In this example, a plurality of the first dampers 2061 are configured to be able to pass through the notch and be connected to the side surface of the voice coil body close to the end surface thereof. That is, the notch opened on the U-iron form an avoidance space, so as to enable the plurality of first dampers to generate vibrations along the vibration direction of the sound-producing device.

Here, the second damper 207 is fixed at a first position, wherein the first position is a side surface of the bobbin 204. Specifically, the first fixing part 2071 is sleeved on the side surface of the bobbin 204; and the second fixing part 2073 is fixed on the casing.

Preferably, the second damper 207 is formed from any one of fiber, cotton, blended fabric or metal materials.

Optionally, the sound-producing device further includes a casing 201, and a conductive terminal 202 is configured to be injection-molded on the casing; the voice coil is connected to the conductive terminal 202 through a connecting wire 203. The connecting wire 203 is a lead wire.

In one example, as shown in FIGS. 1 to 4, there are provided two groups of dampers on the voice coil of the sound-producing device, which improves the stability of the voice coil in the sound-producing device and ensures that the axis of the voice coil and the axis of the sound-producing device are coaxial without skew. The first damper is fixed at the first position or the second position.

Preferably, the planar elastic member spreads outward along a direction from the first connecting part to the second connecting part, and forms a spreading angle which is no less than 10°. The inventors have found that with the increase of the diffusion angle, the value of the mechanical stiffness of the first damper decreases, and the linearity of the mechanical stiffness of the first damper becomes better. For example, the mechanical stiffness of the first damper ranges from 0.2 N/mm to 2 N/mm, and preferably, the mechanical stiffness of the first damper is 0.56 N/mm. Within this range of mechanical stiffness, the performance of the first damper is better, and at the same time, it plays a good role in facilitating position securing of the voice coil.

In this example, the first damper is formed by integrally winding a metal wire, and the metal wire can be any one of phosphor bronze, iron wire, steel wire, and alloy wire. The first damper is formed by integrally winding a metal wire, so that the vibrating diaphragm in the sound-producing device can provide better compliance when vibrating in large displacement, and the process is simple and easy to operate. At the same time, the first damper is made of metal material, which makes it less influenced by high temperature and high humidity environment and has excellent fatigue resistance, and also enables the sound-producing device to work in harsh environments.

The inventors have found that fixing the first damper on the voice coil enables the sound-producing device to have better compliance when the vibration displacement is large; at the same time, it can also reduce the distortion of the sound-producing device and improve the acoustic performance of the sound-producing device.

Figure 5:
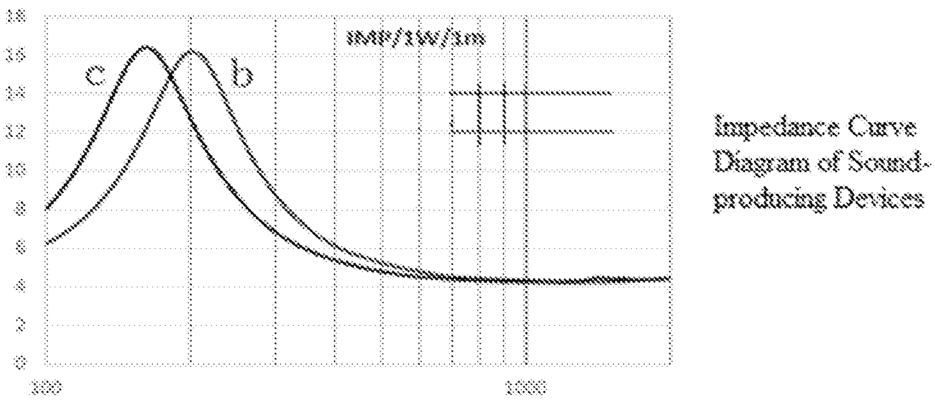
FIG. 5 is a curve diagram showing the impedance curve of the sound-producing device of the present disclosure where the first damper is provided, and that of the prior art sound-producing device where only the second damper is used.

Specifically, as shown in FIG. 5, a curve b represents the impedance curve of a sound-producing device using only the traditional damper (i.e., the second damper); while a curve c represents the impedance curve of the sound-producing device provided with the first damper according to the embodiment of the present disclosure.

Here, when the first damper is used, the resonance frequency F0 of the sound-producing device is 50 Hz to 300 Hz, and preferably, the resonance frequency F0 is 170 Hz. When the traditional damper is used, the resonance frequency F0 of the sound-producing device is 195 Hz. Therefore, when the first damper is applied to the sound-producing device, the sound-producing device has a good low-frequency response, and the acoustic performance of the sound-producing device is improved.

Figure 6:
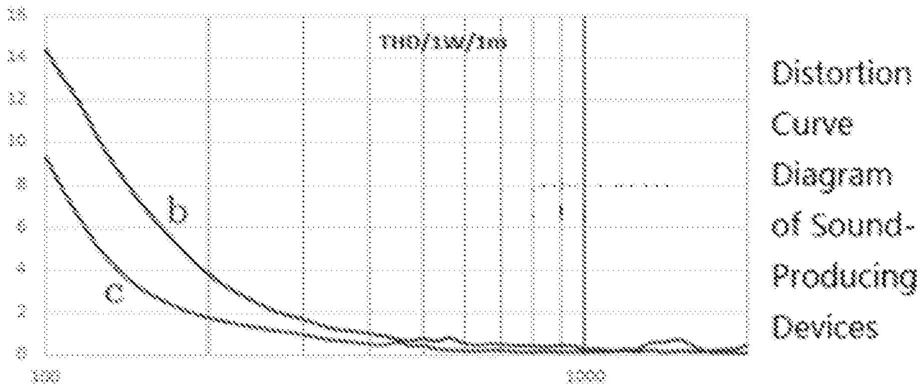
FIG. 6 is a curve diagram showing the distortion curve of the sound-producing device of the present disclosure where the first damper is provided, and that of the prior art sound-producing device where only the second damper is used.

At the same time, applying the first damper in the sound-producing device can reduce the total harmonic distortion THD of the sound-producing device, and improve the acoustic performance of the sound-producing device. Specifically, as shown in FIG. 6, curve b represents a distortion curve of a sound-producing device where a traditional damper is applied; and curve c represents a distortion curve of a sound-producing device where a first damper of the present disclosure is applied.

For example, the total harmonic distortion THD of the sound-producing device of the present disclosure is less than 10% in the frequency range of 100 Hz to 300 Hz; specifically, when the frequency is 100 Hz, the total harmonic distortion THD of the sound-producing device is less than 10%; when the frequency is 200 Hz, the total harmonic distortion THD of the sound-producing device is less than 2.5%; when the frequency is 300 Hz, the total harmonic distortion THD of the sound-producing device is less than 2%.

When only the traditional damper is provided in the sound-producing device, the total harmonic distortion THD of the traditional sound-producing device is less than 16%; specifically, when the frequency is 100 Hz, the total harmonic distortion THD of the sound-producing device is less than 16%; when the frequency is 200 Hz, the total harmonic distortion THD of the sound-producing device is less than 5%; when the frequency is 300 Hz, the total harmonic distortion THD of the sound-producing device is less than 2.5%.

Therefore, the sound-producing device in this example has good acoustic performance.

The present disclosure discloses a sound-producing device, wherein there are at least two groups of dampers provided on the voice coil of the sound-producing device; on one hand, the stability of the internal structure of the sound-producing device is improved; on the other hand, the acoustic performance of the sound-producing device is improved.

Although the present disclosure has been described in detail in connection with some specific embodiments by way of illustration, those skilled in the art should understand that the above examples are provided for illustration only and should not be taken as a limitation on the scope of the disclosure. Those skilled in the art will appreciate that modifications may be made to the above embodiments without departing from the scope and spirit of the present disclosure. We therefore claim as our invention all that comes within the scope of the appended claims.

The invention claimed is:

1. A sound-producing device, comprising a vibrating diaphragm and a voice coil adapted to drive the vibrating diaphragm to vibrate; wherein there are provided at least two groups of dampers on the voice coil, a first group arranged at a first position proximate to the vibrating diaphragm and a second group arranged at a second position distal to the vibrating diaphragm;

wherein the at least two groups of the dampers include at least a first damper and a second damper;

wherein the first damper includes a first connecting part and a second connecting part, the first connecting part connected to the voice coil, and the second connecting part fixed on the sound-producing device;

further comprising a bent planar elastic member between the first connecting part and the second connecting part and located in the same plane as the first connecting part;

wherein the second damper includes a first fixing part and a second fixing part, the first fixing part connected to the voice coil, and the second fixing part fixed on the sound-producing device;

further comprising a connecting arm between the first fixing part and the second fixing part, the connecting arm being in a corrugated shape, wherein the first damper is fixed at the first position; a first connecting part of the first damper is fixed by a connection bridge to a first connecting part of a second damper from the first group of dampers that is adjacent to the first damper, and the second damper is fixed at the second position in a segmented manner.

2. The sound-producing device of claim 1, wherein the voice coil comprises a voice coil body and a bobbin, wherein the voice coil body is wound outside the bobbin and has a height difference from the bobbin;

wherein the first position is a side surface of the bobbin; and wherein the second position is a side surface of the voice coil body close to an end face thereof.

3. The sound-producing device of claim 2, wherein at least one first damper is fixed at a first position;

wherein a first connecting part of the first damper is fixed by a connection bridge to a first connecting part of one of the other first dampers adjacent to the first damper, and the second damper is fixed at the second position in a segmented manner.

4. The sound-producing device of claim 3, wherein the connection bridge is of a convex structure which is attached to the side surface of the voice coil.

5. The sound-producing device of claim 2, wherein the second damper is sleeved at the first position; and the first damper is uniformly fixed at the second position in an array manner.

6. The sound-producing device of claim 2, further comprising a basin-shaped U-iron where a magnet is provided in a basin thereof, the voice coil being provided inside the basin of the U-iron and being under action of a magnetic field of the magnet;

wherein the U-iron is provided with a notch, and the damper provided at the second position is connected to the voice coil through the notch.

7. The sound-producing device of claim 1, wherein the connection bridge is of a convex structure which is attached to the side surface of the voice coil.

8. The sound-producing device of claim 1, further comprising a casing, and a conductive terminal is-configured to be injection-molded on the casing;

wherein the voice coil is connected to the conductive terminal through a connecting wire.

9. The sound-producing device of claim 1, further comprising a basin-shaped U-iron where a magnet is provided in a basin thereof, the voice coil being provided inside the basin of the U-iron and being under action of a magnetic field of the magnet;

wherein the U-iron is provided with a notch, and the damper provided at the second position is connected to the voice coil through the notch.

10. The sound-producing device of claim 1, wherein the planar elastic member spreads outward along a direction from the first connecting part to the second connecting part, and forms a spreading angle which is no less than 10°.

11. The sound-producing device of claim 1, wherein the first damper is formed by integrally winding a metal wire.

12. The sound-producing device of claim 1, wherein the first damper is formed from the group consisting of phosphor bronze, iron wire, steel wire, and alloy wire; and the second damper is formed from the group consisting of fiber, cotton, blended fabric or metallic materials.

13. The sound-producing device of claim 1, wherein a resonance frequency F0 of the first damper is 50 Hz to 300 Hz.

14. A sound-producing device, comprising a vibrating diaphragm and a voice coil adapted to drive the vibrating diaphragm to vibrate; wherein there are provided at least two groups of dampers on the voice coil, a first group arranged at a first position proximate to the vibrating diaphragm and a second group arranged at a second position distal to the vibrating diaphragm;

wherein the at least two groups of the dampers include at least a first damper and a second damper;

wherein the first damper includes a first connecting part and a second connecting part, the first connecting part connected to the voice coil, and the second connecting part fixed on the sound-producing device;

further comprising a bent planar elastic member between the first connecting part and the second connecting part and located in the same plane as the first connecting part;

the second damper including a first fixing part and a second fixing part, the first fixing part connected to the voice coil, and the second fixing part fixed on the sound-producing device;

further comprising a connecting arm between the first fixing part and the second fixing part, the connecting arm being in a corrugated shape, wherein the second damper is sleeved at the first position; and wherein the first damper is uniformly fixed at the second position in an array manner.

* * * * *